United States Patent
Siegenthaler et al.

(10) Patent No.: US 9,234,073 B2
(45) Date of Patent: Jan. 12, 2016

(54) ALIPHATIC POLYESTER

(71) Applicant: BASF SE, Ludwigshafen (DE)

(72) Inventors: Kai Oliver Siegenthaler, Mannheim (DE); Andreas Füβl, Heidelberg (DE); Gabriel Skupin, Speyer (DE); Motonori Yamamoto, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/848,961

(22) Filed: Mar. 22, 2013

(65) Prior Publication Data

US 2013/0214455 A1 Aug. 22, 2013

Related U.S. Application Data

(62) Division of application No. 13/121,659, filed as application No. PCT/EP2009/062261 on Sep. 22, 2009, now abandoned.

(30) Foreign Application Priority Data

Sep. 29, 2008 (EP) ..................... 08165370

(51) Int. Cl.
| | |
|---|---|
| *B29C 45/00* | (2006.01) |
| *C08G 63/16* | (2006.01) |
| *C08G 63/20* | (2006.01) |
| *C08G 63/91* | (2006.01) |
| *C08L 67/00* | (2006.01) |
| *C08K 3/00* | (2006.01) |
| *C08K 5/00* | (2006.01) |
| *C08L 67/02* | (2006.01) |
| *C08L 67/04* | (2006.01) |
| *C08L 69/00* | (2006.01) |

(52) U.S. Cl.
CPC ............... *C08G 63/16* (2013.01); *C08G 63/20* (2013.01); *C08G 63/916* (2013.01); *C08L 67/00* (2013.01); *C08K 3/0008* (2013.01); *C08K 3/0033* (2013.01); *C08K 5/0008* (2013.01); *C08K 5/0016* (2013.01); *C08L 67/02* (2013.01); *C08L 67/04* (2013.01); *C08L 69/00* (2013.01)

(58) Field of Classification Search
CPC .... C08G 69/44; C08G 63/16; C08G 2230/00; C08G 63/127; C08G 63/91; C08G 18/4219; C08G 18/4241; C08G 18/73; C08G 63/08; C08G 63/20; C08G 63/60; C08G 63/78; C08G 81/00; C08G 2310/00; C08G 63/81; B29C 45/0001; B29C 49/06; C08L 67/02; C08L 2666/02; C08L 2666/18
USPC ......................................................... 528/302
See application file for complete search history.

(56) References Cited

U.S. PATENT DOCUMENTS

| | | | |
|---|---|---|---|
| 4,789,727 A | 12/1988 | Sun | |
| 5,434,238 A * | 7/1995 | White et al. .................. | 528/272 |
| 5,817,721 A | 10/1998 | Warzelhan et al. | |
| 5,863,991 A | 1/1999 | Warzelhan et al. | |
| 5,880,220 A | 3/1999 | Warzelhan et al. | |
| 5,883,199 A | 3/1999 | McCarthy et al. | |
| 5,889,135 A | 3/1999 | Warzelhan et al. | |
| 5,936,045 A | 8/1999 | Warzelhan et al. | |
| 6,018,004 A | 1/2000 | Warzelhan et al. | |
| 6,046,248 A | 4/2000 | Warzelhan et al. | |
| 6,103,858 A | 8/2000 | Yamamoto et al. | |
| 6,111,058 A | 8/2000 | Warzelhan et al. | |
| 6,114,042 A | 9/2000 | Warzelhan et al. | |
| 6,120,895 A | 9/2000 | Kowitz et al. | |
| 6,201,034 B1 | 3/2001 | Warzelhan et al. | |
| 6,258,924 B1 | 7/2001 | Warzelhan et al. | |
| 6,303,677 B1 | 10/2001 | Warzelhan et al. | |
| 6,353,084 B1 | 3/2002 | Warzelhan et al. | |
| 7,304,172 B2 | 12/2007 | Coates et al. | |
| 2008/0281018 A1 | 11/2008 | Seeliger et al. | |
| 2011/0034662 A1 | 2/2011 | Witt et al. | |
| 2011/0039999 A1 | 2/2011 | Witt et al. | |

FOREIGN PATENT DOCUMENTS

| | | |
|---|---|---|
| DE | 4440858 | 5/1996 |
| DE | 19638686 | 3/1998 |
| DE | 102005053068 | 5/2007 |
| EP | 488617 | 6/1992 |

(Continued)

OTHER PUBLICATIONS

International Standard ISO 306 2004 Plastics—Determination of Vicat softning temperature, Jul. 15, 2004.*
ASTM D3641-14 Standard Practice for Injection Molding Test Specimens of Thermoplastic Molding and Extrusion Materials, 1991.*
International Search Report , PCT/EP2009/062261—mailed Nov. 5, 2009.
International Report on Patentability—PCT/EP2009/062261—Int'l Filing Date Sep. 22, 2009.
U.S. Appl. No. 13/070,896, filed Mar. 24, 2011, Ren et al.
U.S. Appl. No. 13/121,298, filed Mar. 28, 2011, Steinke et al.

(Continued)

*Primary Examiner* — Ling Choi
*Assistant Examiner* — Gennadiy Mesh
(74) *Attorney, Agent, or Firm* — Drinker Biddle & Reath LLP

(57) ABSTRACT

A method of producing a molded article involving preparing a copolymer obtained by condensation of (i) 90 to 99.5 mol %, based on components i) to ii), of succinic acid; (ii) 0.5 to 10 mol %, based on components i) to ii), of 4 to 10 mol % sebacic acid; (iii) 98 to 102 mol %, based on components i) to ii), of 1,3-propanediol or 1,4-butanediol; (iv) 0.05 to 0.5% by weight, based on the total weight of components i) to iii), of a crosslinker; and (v) 0.35 to 2% by weight, based on the total weight of components i) to iii), of 1,6-hexamethylene diisocyanate. The copolymer is injection molded or blow molded to form a molded article having a wall thickness above 200 μm.

3 Claims, No Drawings

(56) References Cited

FOREIGN PATENT DOCUMENTS

| | | |
|---|---|---|
| EP | 539541 | 5/1993 |
| EP | 0565235 A2 | 10/1993 |
| EP | 575349 | 12/1993 |
| EP | 652910 | 5/1995 |
| EP | 0647668 A1 | 4/1996 |
| EP | 792309 | 9/1997 |
| EP | 1227129 | 7/2002 |
| EP | 1264860 A1 | 12/2002 |
| JP | H05140286 A | 6/1993 |
| JP | 2004-190020 A | 7/2004 |
| JP | 2004300284 | 10/2004 |
| JP | 2005-146482 A | 6/2005 |
| JP | 2005-281677 | 10/2005 |
| JP | 2007-161837 A | 6/2007 |
| WO | WO-92/09654 | 6/1992 |
| WO | WO-92/14782 | 9/1992 |
| WO | WO-92/19680 | 11/1992 |
| WO | WO-94/03543 | 2/1994 |
| WO | WO-96/15173 | 5/1996 |
| WO | WO-96/15174 | 5/1996 |
| WO | WO-96/15175 | 5/1996 |
| WO | WO-96/15176 | 5/1996 |
| WO | WO-96/21689 | 7/1996 |
| WO | WO-96/21690 | 7/1996 |
| WO | WO-96/21691 | 7/1996 |
| WO | WO-96/21692 | 7/1996 |
| WO | WO-96/25446 | 8/1996 |
| WO | WO-96/25448 | 8/1996 |
| WO | WO-98/12242 | 3/1998 |
| WO | WO-2006/074815 | 7/2006 |
| WO | WO-2006/097353 | 9/2006 |
| WO | WO-2006/097354 | 9/2006 |
| WO | WO-2006/097355 | 9/2006 |
| WO | WO-2006/097356 | 9/2006 |
| WO | WO-2007/125039 A1 | 11/2007 |
| WO | WO-2008/138892 A1 | 11/2008 |
| WO | WO-2009/024294 | 2/2009 |
| WO | WO-2009/127555 | 10/2009 |
| WO | WO-2009/127556 | 10/2009 |
| WO | WO 2010/034689 | 4/2010 |
| WO | WO 2010/034712 | 4/2010 |
| WO | WO 2011/054786 | 5/2011 |

OTHER PUBLICATIONS

U.S. Appl. No. 13/070,942, filed Mar. 24, 2011, Ren et al.
U.S. Appl. No. 13/121,535, filed Mar. 29, 2011, Dietrich et al.
U.S. Appl. No. 13/121,560, filed Mar. 29, 2011, Speyer et al.
Helmut Witte, Simple Synthesis of 2-Substituted 2-Oxazolines and 5,6-Dihydro-4H-1,3-oxazines, pp. 287-288, Angew. Chem. Internat. Edit/vol. 11 (1972) No. 4.
Rizzarelli, Soil burial and enzymatic degradation in solution of aliphatic co-polyesters, pp. 855-863, Polymer Degradation and Stability 85 (2004).

* cited by examiner

ALIPHATIC POLYESTER

CROSS REFERENCE TO RELATED APPLICATIONS

This application is a divisional application of U.S. application Ser. No. 13/121,659, filed Sep. 6, 2011, the entire contents of which is incorporated herein by reference in its entirety. U.S. application Ser. No. 13/121,659 is a national stage application (under 35 U.S.C. §371) of PCT/EP2009/062261, filed Sep. 22, 2009, the entire contents of which is incorporated herein by reference in its entirety. This application claims the benefit of European application 08165370.1, filed Sep. 29, 2008, the entire contents of which is incorporated herein by reference in its entirety.

FIELD OF THE INVENTION

The present invention provides a copolymer obtainable by condensation of
  i) 90 to 99.5 mol %, based on components i to ii, of succinic acid;
  ii) 0.5 to 10 mol %, based on components i to ii, of one or more $C_8$-$C_{20}$ dicarboxylic acids;
  iii) 98 to 102 mol %, based on components i to ii, of 1,3-propanediol or 1,4-butanediol, and
having a DIN 53728 viscosity number in the range from 100 to 450 mL/g.

The present invention relates in particular to a copolymer obtainable by condensation of
  i) 90 to 99.5 mol %, based on components i to ii, of succinic acid;
  ii) 0.5 to 10 mol %, based on components i to ii, of azelaic acid, sebacic acid and/or brassylic acid;
  iii) 98 to 102 mol %, based on components i to ii, of 1,3-propanediol or 1,4-butanediol, and
  iv) 0.01% to 5% by weight, based on the total weight of said components i to iii, of a chain extender and/or crosslinker selected from the group consisting of a polyfunctional isocyanate, isocyanurate, oxazoline, epoxide (in particular an epoxy-containing poly(meth)acrylate, an at least trihydric alcohol or an at least tribasic carboxylic acid.

The present invention further provides a process for producing the copolymers, polymer blends comprising these copolymers and also for the use of these copolymers.

BACKGROUND

Polybutylene succinate (PBS) is not always satisfactory with regard to biodegradability and hydrolysis resistance in particular.

EP-A 565 235 discloses aliphatic copolyesters based on succinic acid and sebacic acid. However, their sebacic acid content is distinctly higher than that of the copolyesters of the present invention. The stiffness of this polymer is much reduced compared with PBS, its heat resistance is impaired, its crystallization rate is lower and an associated cycle time is increased and therefore this polymer is not that useful for injection molding.

BRIEF SUMMARY

It is an object of the present invention to provide an aliphatic polyester which has good injection-molding properties. Furthermore, the injection moldings should possess good mechanical properties and improved biodegradability compared to PBS.

We have found that this object is achieved, surprisingly easily, by the copolymers of the present invention.

The copolyesters described are synthesized in a direct polycondensation reaction of the individual components. The dicarboxylic acid derivatives are reacted in this context together with the diol in the presence of a transesterification catalyst to directly form the polycondensate of high molecular weight. Zinc, aluminum and particularly titanium catalysts are typically used. Titanium catalysts such as tetraisopropyl orthotitanate and particularly tetrabutyl orthotitanate (TBOT) are superior to the tin, antimony, cobalt and lead catalysts frequently used in the literature, tin dioctanoate being an example, because any residual quantities of the catalyst or catalyst descendant which remain in the product are less toxic. This fact is particularly important for biodegradable polyesters, since they pass directly into the environment when used as composting bags or mulch sheeting for example.

DETAILED DESCRIPTION OF THE PREFERRED EMBODIMENTS

A mixture of the dicarboxylic acids is generally initially heated in the presence of an excess of diol together with the catalyst for a period of approximately 60-180 min to an internal temperature of 170 to 230° C. and the water produced is distilled off. Subsequently, the melt of the prepolyester thus obtained is typically condensed at an internal temperature of 200:250° C. during 3 to 6 hours at reduced pressure, with distillative removal of released diol, to the desired viscosity with a viscosity number (VN) of 100 to 450 mL/g and preferably 120 to 250 mL/g.

The copolymers of the present invention can additionally be produced by following the processes described in WO 96/15173 and EP-A 488 617. It will be advantageous to initially react components i) to iii) to form a prepolyester having a VN in the range from 50 to 100 mL/g, preferably in the range from 60 to 90 mL/g and then to react the latter with chain extenders vib), for example with diisocyanates or with epoxy-containing polymethacrylates, in a chain-extending reaction to form a polyester having a viscosity number of 100 to 450 mL/g, preferably 120 to 250 mL/g.

Acid component i used is 90 to 99.5 mol %, based on acid components i and ii, preferably 91 to 99 mol % and more preferably 92 to 98 mol % of succinic acid. Succinic acid is obtainable petrochemically and preferably also from renewable raw materials as described, for example, in PCT/EP2008/006714. PCT/EP2008/006714 discloses a biotechnological process for production of succinic acid and 1,4-butanediol from different carbohydrates using microorganisms from the class of the *Pasteurellaceae*.

Acid component ii relates to one or more $C_8$-$C_{20}$ dicarboxylic acids such as octanedioic acid (suberic acid), nonanedioic acid (azelaic acid), decanedioic acid (sebacic acid), undecanedioic acid, dodecanedioic acid, tridecanedioic acid (brassylic acid), tetradecanedioic acid and hexadecanedioic acid. Preferred dicarboxylic acids are: azelaic acid, sebacic acid and/or brassylic acid. Particular preference is given to sebacic acid. Acid component ii is used in 0.5 to 10 mol %, preferably 1 to 9 mol % and more preferably 2 to 8 mol %, based on acid components i and ii. Sebacic acid is obtainable from renewable raw materials, in particular from castor oil. Azelaic acid and brassylic acid are obtainable for example by proceeding from plant oils as per WO 2008/

138892 A1. Such polyesters are notable for excellent biodegradability [reference: Polym. Degr. Stab. 2004, 85, 855-863].

Succinic acid and sebacic acid can be used either as free acid or in the form of ester-forming derivatives. Useful ester-forming derivatives include particularly the di-$C_1$- to $C_6$-alkyl esters, such as the dimethyl, diethyl, di-n-propyl, diisopropyl, di-n-butyl, diisobutyl, di-t-butyl, di-n-pentyl, diisopentyl or di-n-hexyl esters. Anhydrides of the dicarboxylic acids can likewise be used.

The dicarboxylic acids or their ester-forming derivatives can be used individually or in the form of a mixture.

The diols 1,3-propanediol and 1,4-butanediol are likewise obtainable from renewable raw materials. Mixtures of the two diols can also be used. The preferred diol is 1,4-butanediol because of the relatively high melt temperatures and the better crystallization of the copolymer formed.

In general, at the start of the polymerization, the diol (component iii) is adjusted relative to the acids (components i and ii) such that the ratio of diol to diacids be in the range from 1.0:1 to 2.5:1 and preferably in the range from 1.3:1 to 2.2:1. Excess quantities of diol are withdrawn during the polycondensation, so that an approximately equimolar ratio becomes established at the end of the polymerization. By "approximately equimolar" is meant a diol/diacids ratio in the range from 0.98 to 1.02.

The copolymers mentioned may have hydroxyl and/or carboxyl end groups in any desired proportion. The aliphatic polyesters mentioned can also be subjected to end group modification. For instance, OH end groups can be acid modified by reaction with phthalic acid, phthalic anhydride, trimellitic acid, trimellitic anhydride, pyromellitic acid or pyromellitic anhydride. Preference is given to copolymers having low acid numbers.

Generally 0.01% to 5% by weight, preferably 0.02% to 3% by weight and more preferably 0.055% to 2% by weight based on the total weight of components i to iii of a crosslinker iva and/or chain extender ivb selected from the group consisting of a polyfunctional isocyanate, isocyanurate, oxazoline, carboxylic anhydride such as maleic anhydride, epoxide (in particular an epoxy-containing poly(meth)acrylate), an at least trihydric alcohol or an at least tribasic carboxylic acid is used. Useful chain extenders ivb include polyfunctional and particularly difunctional isocyanates, isocyanurates, oxazolines or epoxides. The crosslinkers iva) are generally used in a concentration of 0.01% to 5% by weight, preferably 0.02% to 1% by weight and more preferably 0.05% to 0.5% by weight based on the total weight of components i to iii. The chain extenders ivb) are generally used in a concentration of 0.01% to 5% by weight, preferably 0.2% to 4% by weight and more preferably 0.35% to 2% by weight based on the total weight of the components i to iii.

Chain extenders and also alcohols or carboxylic acid derivatives having three or more functional groups can also be considered as crosslinkers. Particularly preferred compounds have three to six functional groups. Examples are tartaric acid, citric acid, malic acid; trimethylolpropane, trimethyolethane; pentaerythritol; polyethertriols and glycerol, trimesic acid, trimellitic acid, trimellitic anhydride, pyromellitic acid and pyromellitic anhydride. Preference is given to polyols such as trimethylolpropane, pentaerythritol and particularly glycerol. Components iv can be used to construct biodegradable polyesters which are pseudoplastic. Melt rheology improves; the biodegradable polyesters are easier to process, for example easier to draw into self-supporting film/sheet by melt-solidification. Compounds Iv have a shear-thinning effect, i.e. they enhance the pseudoplasticity of the polymer. Viscosity decreases under load.

The term "epoxides" is to be understood as meaning particularly epoxy-containing copolymer based on styrene, acrylic ester and/or methacrylic ester. The units which bear epoxy groups are preferably glycidyl(meth)acrylates. Copolymers having a glycidyl methacrylate content of greater than 20%, more preferably greater than 30% and even more preferably greater than 50% by weight of the copolymer will be found particularly advantageous. The epoxy equivalent weight (EEW) in these polymers is preferably in the range from 150 to 3000 and more preferably in the range from 200 to 500 g/equivalent. The weight average molecular weight $M_W$ of the polymers is preferably in the range from 2000 to 25 000 and particularly in the range from 3000 to 8000. The number average molecular weight $M_n$ of the polymers is preferably in the range from 400 to 6000 and particularly in the range from 1000 to 4000. The polydispersity (Q) is generally between 1.5 and 5. Epoxy-containing copolymers of the abovementioned type are commercially available, for example from BASF Resins B.V. under the Joncryl® ADR brand. Joncryl® ADR 4368, for example, is particularly useful as chain extender.

It is generally sensible to add the crosslinking (at least trifunctional) compounds at an early stage of the polymerization.

Useful bifunctional chain extenders include the following compounds:

An aromatic diisocyanate d1 comprises in particular tolylene 2,4-diisocyanate, tolylene 2,6-diisocyanate, 2,2'-diphenylmethane diisocyanate, 2,4'-diphenylmethane diisocyanate, 4,4'-diphenylmethane diisocyanate, naphthylene 1,5-diisocyanate or xylylene diisocyanate. Of these, particular preference is given to 2,2'-, 2,4'- and also 4,4'-diphenylmethane diisocyanates. In general, the latter diisocyanates are used as a mixture. The diisocyanates will also comprise minor amounts, for example up to 5% by weight, based on the total weight, of urethione groups, for example for capping the isocyanate groups.

The term "aliphatic diisocyanate" herein refers particularly to linear or branched alkylene diisocyanates or cycloalkylene diisocyanates having 2 to 20 carbon atoms, preferably 3 to 12 carbon atoms, for example 1,6-hexamethylene diisocyanate, isophorone diisocyanate or methylenebis(4-isocyanatocyclohexane). Particularly preferred aliphatic diisocyanates are isophorone diisocyanate and, in particular, 1,6-hexamethylene diisocyanate.

The preferred isocyanurates include the aliphatic isocyanurates which derive from alkylene diisocyanates or cycloalkylene diisocyanates having 2 to 20 carbon atoms, preferably 3 to 12 carbon atoms, for example isophorone diisocyanate or methylenebis(4-isocyanatocyclohexane). The alkylene diisocyanates here may be either linear or branched. Particular preference is given to isocyanurates based on n-hexamethylene diisocyanate, for example cyclic trimers, pentamers or higher oligomers of 1,6-hexamethylene diisocyanate.

2,2'-Bisoxazolines are generally obtainable via the process from Angew. Chem. Int. Ed., Vol. 11 (1972), S. 287-288. Particularly preferred bisoxazolines are those in which $R^1$ is a single bond, a $(CH_2)_z$ alkylene group, where z=2, 3 or 4, such as methylene, 1,2-ethanediyl, 1,3-propanediyl, 1,2-propanediyl or a phenylene group. Particularly preferred bisoxazolines are 2,2'-bis(2-oxazoline), bis(2-oxazolinyl)methane, 1,2-bis(2-oxazolinyl)ethane, 1,3-bis(2-oxazolinyl)

propane or 1,4-bis(2-oxazolinyl)butane, in particular 1,4-bis (2-oxazolinyl)benzene, 1,2-bis(2-oxazolinyl)benzene or 1,3-bis(2-oxazolinyl)benzene.

The amounts of compounds Iv used range from 0.01% to 5%, preferably from 0.05% to 2% and more preferably from 0.08% to 1% by weight, based on the amount of polymer.

The number average molecular weight (Mn) of the preferred copolymers is generally in the range from 5000 to 100 000, particularly in the range from 10 000 to 75 000 g/mol, preferably in the range from 15 000 to 50 000 g/mol, their weight average molecular weight (Mw) is generally in the range from 30 000 to 300 000, preferably 60 000 to 200 000 g/mol, and their Mw/Mn ratio is generally in the range from 1 to 6, preferably in the range from 2 to 4. The viscosity number is generally between 30 and 450 g/mL and preferably in the range from 50 to 400 g/mL (measured in 50:50 w/w o-dichloro-benzene/phenol). The melting point is in the range from 85 to 130° C. and preferably in the range from 95 to 120° C.

The viscosity number (VN) of the copolymers formed is in the range from 100 to 450 mL/g, preferably in the range from 110 to 300 mL/g and particularly in the range from 120 to 250 mL/g.

One preferred embodiment comprises selecting 1% to 80% by weight, based on the total weight of components i to iv, of an organic filler selected from the group consisting of native or plasticized starch, natural fibers, wood meal, comminuted cork, ground bark, nut shells, ground presscakes (vegetable oil refining), dried production residues from the fermentation or distillation of beverages such as, for example, beer, brewed lemonades, wine or sake and/or an inorganic filler selected from the group consisting of chalk, graphite, gypsum, conductivity carbon black, iron oxide, calcium chloride, dolomite, kaolin, silicon dioxide (quartz), sodium carbonate, titanium dioxide, silicate, wollastonite, mica, montmorillonites, talcum, glass fibers and mineral fibers.

Starch and amylose may be native, i.e., non-thermoplasticized, or they may be thermoplasticized with plasticizers such as glycerol or sorbitol for example (EP-A 539 541, EP-A 575 349, EP 652 910).

Natural fibers are cellulose fibers, hemp fibers, sisal, kenaf, jute, flax, abacca, coir fiber or even wood meal.

Preferred fibrous fillers are glass fibers, carbon fibers, aramid fibers, potassium titanate fibers and natural fibers, of which glass fibers in the form of E-glass are particularly preferred. These can be used as rovings or particularly as chopped glass in the commercially available forms. The diameter of these fibers is generally in the range from 3 to 30 µm, preferably in the range from 6 to 20 µm and more preferably in the range from 8 to 15 µm. The fiber length in the compound is generally in the range from 20 µm to 1000 µm, preferably in the range from 180 to 500 µm and more preferably in the range from 200 to 400 µm.

The fillers may have been surface-pretreated, with a silane compound for example, for superior compatibility with the thermoplastic.

Suitable silane compounds are those of the general formula

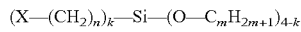

where
X is $NH_2$—,

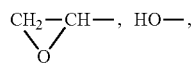

n is a whole number from 2 to 10, preferably 3 to 4
m is a whole number from 1 to 5, preferably 1 or 2
k is a whole number from 1 to 3, preferably 1.

Preferred silane compounds are aminopropyltrimethoxysilane, aminobutyltrimethoxy-silane, aminopropyltriethoxysilane, aminobutyltriethoxysilane and also the corresponding silanes which comprise a glycidyl group as substituent X, or halosilanes.

The amount of silane compound used for surface coating is generally in the range from 0.01% to 2%, preferably 0.025% to 1.0% and particularly 0.05% to 0.5% by weight (based on C).

The biodegradable polyester blends of the present invention may comprise further ingredients which are known to a person skilled in the art but which are not essential to the present invention. Examples are the materials customarily added in plastics technology, such as stabilizers; nucleating agents, neutralizing agents; lubricating and release agents such as stearates (particularly calcium stearate); plasticizers such as for example citric esters (particularly tributyl citrate and tributyl acetylcitrate), glyceric esters such as triacetylglycerol or ethylene glycol derivatives, surfactants such as polysorbates, palmitates or laurates, waxes such as for example beeswax or beeswax ester; antistat, UV absorber; UV stabilizer; antifog agent or dyes. The additives are used in concentrations of 0% to 5% by weight and particularly 0.1% to 2% by weight based on the copolymers of the present invention. Plasticizers may be present in the copolymers of the present invention at 0.1% to 10% by weight.

The biodegradable copolymer blends of the present invention are produced from the individual components by following known processes (EP 792 309 and U.S. Pat. No. 5,883, 199). For example, all the blending partners can be mixed and reacted in one process step in mixing apparatuses known to one skilled in the art, for example kneaders or extruders (in particular twin- or multishaft extruder), at elevated temperatures, for example in the range from 120° C. to 300° C., preferably 150° C. to 250° C.

Typical copolymer blends comprise:
5% to 95% by weight, preferably 20% to 80% by weight and more preferably 40% to 75% by weight of a copolymer of the present invention and
95% to 5% by weight, preferably 80% to 20% by weight and more preferably 60% to 40% by weight of a polymer selected from the group consisting of polylactic acid, polycaprolactone, polyhydroxyalkanoate, aliphatic polycarbonate, chitosan and gluten and/or a polyester based on aliphatic diols and aliphatic/aromatic dicarboxylic acids such as polybutylene succinate (PBS), polybutylene succinate adipate (PBSA), poly(butylene adipate-co-terephthalate) (PBAT).

The copolymer blends preferably comprise in turn 0.05% to 2% by weight of a compatibilizer. Preferred compatibilizers are carboxylic anhydrides such as maleic anhydride and particularly the above-described epoxy-containing copolymers based on styrene, acrylic ester and/or methacrylic ester. The epoxy-bearing units are preferably glycidyl(meth)acrylates. Epoxy-containing copolymers of the abovementioned type are commercially available, for example from BASF Resins B.V. under the Joncryl® ADR brand. Joncryl® ADR 4368 for example is particularly useful as a compatibilizer.

Polylactic acid for example is useful as a biodegradable polyester. Polylactic acid having the following profile of properties is preferably used:
an ISO 1133 MVR melt volume rate at 190° C. and 2.16 kg of 0.5—preferably 2- to 30 ml/10 minutes
a melting point below 175° C.;

a glass transition point Tg above 55° C.

a water content of less than 1000 ppm a residual monomer content (L-lactide) of less than 0.3% a molecular weight of greater than 80 000 daltons.

Preferred polylactic acids are for example NatureWorks® 3001, 3051, 3251, 4032 or 4042D (polylactic acids from NatureWorks or NL-Naarden and USA Blair/Nebraska).

Polyhydroxyalkanoates are primarily poly-4-hydroxybutyrates and poly-3-hydroxy-butyrates, but further comprise copolyesters of the aforementioned hydroxybutyrates with 3-hydroxyvalerates. Poly-4-hydroxybutyrates are known from Metabolix in particular. They are marketed under the trade name of Mirel®. Poly-3-hydroxybutyrates are marketed for example by PHB Industrial under the trade name of Biocycle® and by Tianan under the name of Enmat®.

The molecular weight Mw of the polyhydroxyalkanoates is generally in the range from 100 000 to 1 000 000 and preferably in the range from 300 000 to 600 000.

Partly aromatic polyesters based on aliphatic diols and aliphatic/aromatic dicarboxylic acids also comprise polyester derivatives such as polyether esters, polyester amides or polyether ester amides. Suitable partly aromatic polyesters include linear non-chain-extended polyesters (WO 92/09654). Preference is given to chain-extended and/or branched partly aromatic polyesters. The latter are known from the above-cited references WO 96/15173 to 15176, 21689 to 21692, 25446, 25448 or WO 98/12242, which are each expressly incorporated herein by reference. Mixtures of different partly aromatic polyesters are similarly suitable. Partly aromatic polyesters are to be understood as meaning in particular products such as Ecoflex® (BASF Aktiengesellschaft), Eastar® Bio and Origo-Bi® (Novamont).

Polycaprolactone is marketed by Daicel under the product name of Placcel®.

Aliphatic polycarbonates are in particular polyethylene carbonate and polypropylene carbonate.

The copolymers and copolymer blends of the present invention have superior biodegradability to PBS.

The "biodegradable" feature shall for the purposes of the present invention be considered satisfied for any one material or composition of matter when this material or composition of matter has a DIN EN 13432 percentage degree of biodegradation equal to at least 90% after the prescribed periods of time.

The general effect of biodegradability is that the polyester (blends) decompose within an appropriate and verifiable interval. Degradation may be effected enzymatically, hydrolytically, oxidatively and/or through action of electromagnetic radiation, for example UV radiation, and may be predominantly due to the action of microorganisms such as bacteria, yeasts, fungi and algae. Biodegradability can be quantified, for example, by polyesters being mixed with compost and stored for a certain time. According to DIN EN 13432 citing ISO 14855, for example, $CO_2$-free air is flowed through ripened compost during composting and the ripened compost subjected to a defined temperature program. Biodegradability here is defined via the ratio of the net $CO_2$ released by the sample (after deduction of the $CO_2$ released by the compost without sample) to the maximum amount of $CO_2$ releasable by the sample (reckoned from the carbon content of the sample), as a percentage degree of biodegradation. Biodegradable polyesters/polyester blends typically show clear signs of degradation, such as fungal growth, cracking and holing, after just a few days of composting.

Other methods of determining biodegradability are described in ASTM D 5338 and ASTM D 6400 for example.

The copolymers of the present invention are useful for producing adhesives, dispersions, moldings, extruded foams, bead foams, self-supporting film/sheet and film ribbons for nets and fabrics, tubular film, chill roll film with and without orientation in a further operation, with and without metallization or Siox coating. Molded articles are particularly molded articles having wall thicknesses above 200 µm, which are obtainable using molding processes such as injection molding, injection blow molding, extrusion/thermoforming, extrusion blow molding and calendering/thermoforming.

The components from the present invention copolymers possess good biodegradability compared with those from PBS. Interesting fields of application are therefore: catering cutlery, plates, plant pots, tiles, refillable containers and closures for non-food applications such as detergents or agricultural products and food applications, extrusion-blown or injection stretch blown moldings such as bottles, film applications for inliners, flexible intermediate bulk containers, carrier bags, freezer bags, beverage bottles, bottles for other contents, twisted lid containers for cosmetics, etc.

EXAMPLES

Performance-Related Measurements:

The molecular weight $M_n$ of partly aromatic polyesters was determined as follows:

15 mg of partly aromatic polyester were dissolved in 10 ml of hexafluoroisopropanol (HFIP). 125 µl at a time of this solution were analyzed by means of gel permeation chromatography (GPC). The measurements were carried out at room temperature. HFIP+0.05% by weight of potassium trifluoroacetate was used for elution. The elution rate was 0.5 ml/min. The column combination used was as follows (all columns from Showa Denko Ltd., Japan): Shodex® HFIP-800P (diameter 8 mm, length 5 cm), Shodex® HFIP-803 (diameter 8 mm, length 30 cm), Shodex® HFIP-803 (diameter 8 mm, length 30 cm). The partly aromatic polyesters were detected by means of an RI detector (differential refractometry). Narrowly distributed polymethyl methacrylate standard having molecular weights of $M_n=505$ to $M_n=2\,740\,000$ were used for calibration. Elution ranges outside this interval were determined by extrapolation.

Viscosity numbers were determined in accordance with DIN 53728 Part 3, Jan. 3, 1985. The solvent used was a 50/50 w/w phenol/o-dichlorobenzene mixture.

Melting temperatures of partly aromatic polyesters were determined by DSC measurements using an Exstet DSC 6200R from Seiko:

10 to 15 mg of each sample were heated under nitrogen from −70° C. to 200° C. at a heating rate of 20° C./min. Melting temperatures reported for the samples are the peak temperatures of the melt peaks observed in the course of the heating. An empty crucible was used as reference in each case.

The degradation rates of the biodegradable polyester blends and of the comparative blends were assessed as follows:

The biodegradable polyester blends and the blends produced for comparison were each pressed at 190° C. to form films approximately 30 µm in thickness. These films were each cut into rectangular pieces having an edge length of 2 cm×5 cm. The weight of these film pieces was determined. The film pieces were heated for four weeks in a drying cabinet to 58° C. in a plastics tin filled with moistened composting earth. The remaining weight of the film pieces was determined at weekly intervals. On the assumption that biodegradability in these cases can be regarded as a purely surface process, the slope of the weight decrease obtained (rate of biodegradation) was determined by computing the difference from the weight measured after sample taking and the mass of the film before the start of the test, minus the average overall weight decrease up to the preceding sample taking. The mass reduction obtained was also standardized to the surface area (in cm$^2$) and also to the time between the current and the preceding sample taking (in d).

VICAT softening temperature (Vicat A) was determined in accordance with ISO 306: 2004 on specimens having a thickness of 0.4 mm.

Modulus of elasticity, stress at yield and strain at break were determined by means of a tensile test on pressed sheets about 420 μm in thickness in accordance with ISO 527-3: 2003.

A puncture resistance test on pressed sheets 420 μm in thickness was used to measure the ultimate strength and the fracture energy of the polyesters:

The testing machinery used was a Zwick 1120 equipped with a spherical dolly having a diameter of 2.5 mm. The sample, a circular piece of the sheet to be measured, was clamped perpendicularly relative to the dolly and this dolly was moved at a constant test speed of 50 mm/min through the plane of the clamping device. Force and extension were recorded during the test and used to determine puncture energy.

EXAMPLES

Example V-1 (PBS, Comparative Example)

A mixture of butanediol (93.7 g, 130 mol %), succinic acid (94.5 g, 100 mol %) and glycerol (0.2 g, 0.1% by weight) was heated to 200° C. in the presence of TBOT (0.2 g), and the water formed was distilled off during 30 min. This prepolyester was subsequently converted at reduced pressure (<5 mbar) to the high molecular weight polyester. To this end, 1,4-butanediol was distilled off at a temperature of up to 250° C. The polyester obtained had a viscosity number of 171 mL/g.

Example 2

PBSSe (S:Se=98:2)

A mixture of butanediol (70.0 g, 130 mol %), succinic acid (69.2 g, 98 mol %), sebacic acid (2.4 g, 2 mol %) and glycerol (0.14 g, 0.1% by weight) was heated to 200° C. in the presence of TBOT (0.09 mL). The melt was maintained at 200° C. for 80 min and water was distilled off. Subsequently, 1,4-butanediol was distilled off at reduced pressure (<5 mbar) and a maximum internal temperature of 250° C. The polyester was poured out and analyzed after cooling. The polyester obtained had a viscosity number of 165 mL/g.

Example 3

PBSSe (S:Se=96:4)

A mixture of butanediol (91.1 g, 130 mol %), succinic acid (88.2 g, 96 mol %), sebacic acid (6.3 g, 4 mol %) and glycerol (0.19 g, 0.1% by weight) was heated to 200° C. in the presence of TBOT (0.2 g). The melt was maintained at 200° C. for 80 min and water was distilled off. Subsequently, 1,4-butanediol was distilled off at reduced pressure (<5 mbar) and a maximum internal temperature of 250° C. The polyester was poured out and analyzed after cooling. The polyester obtained had a viscosity number of 208 mL/g.

Example 4

PBSSe (S:Se=94:6)

A mixture of butanediol (90.9 g, 130 mol %), succinic acid (86.1 g, 94 mol %), sebacic acid (9.4 g, 6 mol %) and glycerol (0.19 g, 0.1% by weight) was heated to 200° C. in the presence of TBOT (0.2 g). The melt was maintained at 200° C. for 80 min and water was distilled off. Subsequently, 1,4-butanediol was distilled off at reduced pressure (<5 mbar) and a maximum internal temperature of 250° C. The polyester was poured out and analyzed after cooling. The polyester obtained had a viscosity number of 220 mL/g.

Example 5

PBSSe (S:Se=92:8)

A mixture of butanediol (88.7 g, 130 mol %), succinic acid (82.2 g, 92 mol %), sebacic acid (12.2 g, 8 mol %) and glycerol (0.19 g, 0.1% by weight) was heated to 200° C. in the presence of TBOT (0.2 g). The melt was maintained at 200° C. for 80 min and water was distilled off. Subsequently, 1,4-butanediol was distilled off at reduced pressure (<5 mbar) and a maximum internal temperature of 250° C. The polyester was poured out and analyzed after cooling. The polyester obtained had a viscosity number of 169 mL/g.

Example 6

PBSSe (S:Se=90:10)

A mixture of butanediol (87.5 g, 130 mol %), succinic acid (79.4 g, 90 mol %), sebacic acid (15.1 g, 10 mol %) and glycerol (0.18 g, 0.1% by weight) was heated to 200° C. in the presence of TBOT (0.2 g). The melt was maintained at 200° C. for 80 min and water was distilled off. Subsequently, 1,4-butanediol was distilled off at reduced pressure (<5 mbar) and a maximum internal temperature of 250° C. The polyester was poured out and analyzed after cooling. The polyester obtained had a viscosity number of 252 mL/g.

TABLE 1

| | | Thermal properties (DSC) | | | | | |
|---|---|---|---|---|---|---|---|
| Example | PBSSe (S:Se) | $T_g$ [° C.] | $T_m$ [° C.] | $T_c$ [° C.] | FWHM [° C.] | $H_1$ [J/g] | $H_2$ [J/g] |
| V-1 | 100:0 | −35 | 112.5 | 64.7 | 10 | 85 | 83 |
| 2 | 98:2 | −39 | 111.0 | 72.5 | 6 | 93 | 82 |
| 3 | 96:4 | −39 | 108.4 | 61.5 | 8 | 85 | 77 |
| 4 | 94:6 | −41 | 106.6 | 57.4 | 8 | 79 | 74 |
| 5 | 92:8 | −43 | 103.9 | 59.8 | 4 | 80 | 72 |
| 6 | 90:10 | −45 | 101.9 | 57.1 | 5 | 77 | 71 |

TABLE 2

| | Heat resistance (Vicat A) | |
|---|---|---|
| Example | PBSSe (S:Se) | Vicat A [° C.] |
| V-1 | 100:0 | 105 |
| 2 | 98:2 | 104 |
| 3 | 96:4 | 102 |

TABLE 2-continued

Heat resistance (Vicat A)

| Example | PBSSe (S:Se) | Vicat A [° C.] |
|---|---|---|
| 4 | 94:6 | 102 |
| 5 | 92:8 | 98 |
| 6 | 90:10 | 99 |

TABLE 3

Mechanical properties

| Example | PBSSe (S:Se) | E modulus [MPa] | Stress at yield [MPa] | Strain at break [%] | Damaging force [N] |
|---|---|---|---|---|---|
| V-1 | 100:0 | 569 | 30.6 | 268 | 54.7 |
| 2 | 98:2 | 511 | | | 58.6 |
| 3 | 96:4 | 459 | 31.2 | 271 | 51.7 |
| 4 | 94:6 | 432 | 29.1 | 264 | 51.2 |
| 5 | 92:8 | 414 | 28.9 | 168 | 47.9 |
| 6 | 90:10 | 375 | 25.6 | 407 | 47.0 |

The degradation rates were determined as described at the beginning of the experimental part. Absolute, mutually comparable rates were obtained. As is apparent from table 4, incorporation of sebacic acid distinctly enhances the degradation rate.

TABLE 4

Degradation rates of different PBSSe copolyesters.

| Example | PBSSe, mol % Se | Degradation rate absolute [µg/cm$^2$d] | Degradation rate relative |
|---|---|---|---|
| V-1 | 0 | 31 | 100% |
| 3 | 4 | 81 | 260% |
| 4 | 6 | 110 | 355% |
| 6 | 10 | 166 | 535% |

The invention claimed is:

1. A method of producing a molded article comprising preparing a copolymer obtained by condensation of:
   i) 90 to 96 mol %, based on components i) to ii), of succinic acid;
   ii) 4 to 10 mol %, based on components i) to ii), sebacic acid;
   iii) 98 to 102 mol %, based on components i) to ii), of 1,3-propanediol or 1,4-butanediol;
   iv) 0.05 to 0.5% by weight, based on the total weight of components i) to iii), of a crosslinker selected from the group consisting of glycerol, trimethylolpropane, and trimethylolethane; and
   v) 0.35 to 2% by weight, based on the total weight of components i) to iii), of 1,6-hexamethylene diisocyanate, and
   injection molding or blow molding the copolymer to form a molded article having a wall thickness above 200 µm.

2. The method of producing the molded article according to claim 1, wherein component iii) is 1,4-butanediol.

3. The method of producing the molded article according to claim 1, wherein the crosslinker is glycerol.

* * * * *